Nov. 4, 1930.  V. J. BURNELLI  1,780,813
AIRPLANE
Filed March 1, 1929  2 Sheets-Sheet 2

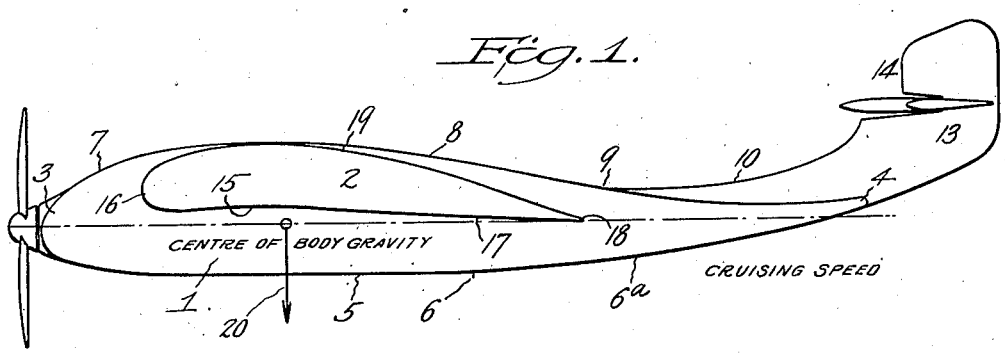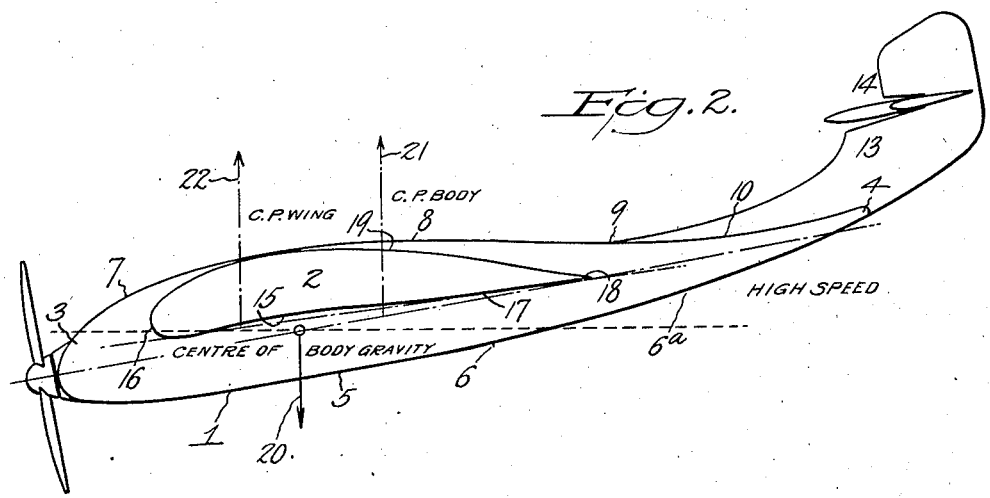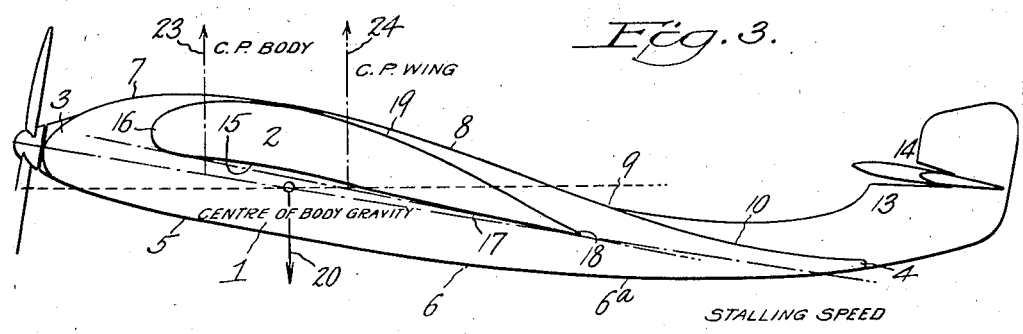

Inventor
Vincent J. Burnelli
By his Attorney
Frederick W. Barker

Patented Nov. 4, 1930

1,780,813

UNITED STATES PATENT OFFICE

VINCENT J. BURNELLI, OF NEW YORK, N. Y., ASSIGNOR TO THE UPPERCU-BURNELLI CORPORATION, A CORPORATION OF DELAWARE

AIRPLANE

Application filed March 1, 1929. Serial No. 343,796.

In the Burnelli type of airplane, having an airfoil fuselage that extends out toward the empennage and having a monoplane supporting unit associated with said airfoil fuselage, longitudinal stability is achieved by causing the centre of pressure for both the airfoil fuselage and the monoplane supporting unit to coincide with the centre of gravity of the airplane when flying at cruising speed, which may be termed the normal flying attitude.

At low angles, as at high speed, or at high incidence, as in a stall, the centre of pressure for all efficient airfoil shifts, respectively, fore and aft, thereby changing the relation of the centre of pressure to the centre of gravity, and causing either tail or nose heaviness to ensue.

As the airfoil fuselage of a Burnelli type of airplane is a wing section it has centre of pressure variation characteristics similar to those of the main supporting airfoils, but if the centre of pressure of the airfoil fuselage were to shift in the same direction as occurs in the instance of the main supporting wings instability would result, because the chord of the airfoil fuselage is so much longer, and the resultant lift of the centres of pressure for the two lifting areas would run a greater distance from the fixed centre of gravity.

In order to neutralize this tendency in the Burnelli type of airplane and to assure longitudinal stability the airfoil fuselage is contoured to cause its centre of pressure to shift in the opposite direction to that of the main supporting airfoils, whereby the centre of gravity lies intermediate the two shifting centres of pressure, separate therefrom, respectively either fore or aft, accordingly as the airplane assumes upward or downward inclinations.

As the lift of the airfoil fuselage is less than that of the main supporting airfoils the centre of pressure for the former must travel, in the opposite direction, farther than that of the latter, in order that the moment arms of the two lifting forces will counterbalance about the centre of gravity at angled attitudes of the airplane or shift of the centre of pressure.

While a specific example of contour for an airfoil fuselage is hereinafter given and illustrated in the drawing, in conjunction with a main supporting airfoil of given section, it is appreciated that variations in contour of these elements will require testing in the wind tunnel to prove their efficiency, as has been done with this example.

The change is normal direction of the centre of pressure which runs with respect to the airfoil fuselage can be influenced by the employment of a negative trailing edge therefor, by the upper and lower contours thereof, and in varying its area as by reducing its rearward width. Also the shape of the entering edge of the airfoil fuselage may be modified, and other minor contour changes become factors in the general scheme whereby the centre of pressure for the airfoil fuselage may be controlled in its direction of shift relatively to that of the main supporting airfoils.

Another feature of invention comprised in this application consists in according to the under, rearward portion of the fuselage-airfoil a curvature that is asymmetrical with and in tapering relation to the airfoil contour at the upper rearward surface thereof, to thereby establish, in flight, a downward vacuum pull, toward the region of the fuselage-airfoil trailing edge, which will counteract the tendency of the upward vacuum pull to put the airplane into a nose dive when flying at a steep descending angle.

Other features and advantages of my invention will hereinafter appear.

In the drawing:—

Figure 1 is a side elevation of a Burnelli type airplane in the attitude it has when flying at high speed, the main supporting airfoils and airfoil-fuselage being so related that in this attitude their respective centres of pressure coincide with the centre of gravity through the airplane.

Fig. 2 is a similar view of said airplane when at a diving angle.

Fig. 3 is a similar view of said airplane when at a climbing angle and

Figure 4:
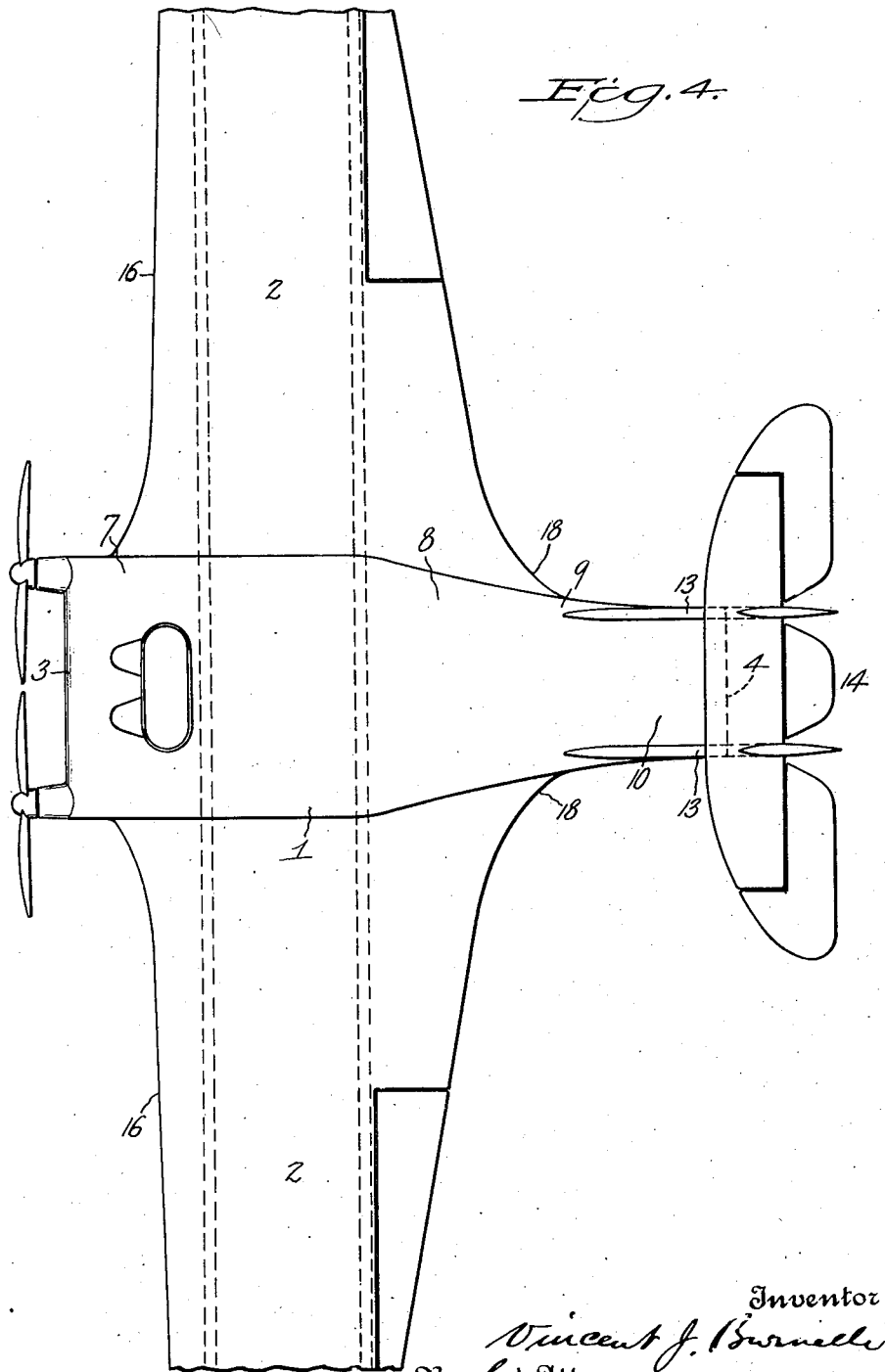
Fig. 4 is a plan view.

In said figures let 1 indicate the airfoil fuselage, (hereinafter referred to as airfoil 1) of a Burnelli type airplane, and let 2 indicate the side main supporting airfoils therefor.

By way of example, airfoil 1 may have the general contour of the Burnelli type airfoil-fuselage and the airfoils 2 may have the general contour of a 298 Gottigen airfoil.

As will be noted in the drawing, the airfoil 1, whose chord extends from the nose 3 to the trailing edge 4, is provided with the lower pressure receiving surface 5 which however at the point 6 is provided with a rearwardly upward curve $6^a$ that continues to the trailing edge 4.

The upper surface of the airfoil 1 is characterized by a contour that includes the upward curve 7, leaving the nose 3, that continues rearwardly in the slightly downward curved inclination 8 to the point 9, whence it resolves into a concave formation 10 that terminates at the trailing edge 4. The vertical fin 13 which supports the tail group 14 is carried by the rear portion of the airfoil-fuselage.

No landing chassis appears in the drawing because in flight the same will be retracted, and the views represented are intended to show the airplane in different flight attitudes.

The main supporting airfoils 2 are of smaller cross-sectional area and are extended, repectively, from opposite sides of the airfoil 1. A distinction exists in that the under surfaces of the airfoils 2 may have a slight camber 15 for the major portion of the chord, from the nose 16 rearwardly, as to the point 17, whence said under surface continues in an approximately straight line to the trailing edge 18. The nose 16 is relatively blunt, and the upper surface of each airfoil 2 extends rearwardly to the trailing edge in a descending curve 19.

The example of my invention illustrated sets up in the described contours of the airfoils 1, 2 a pressure couple wherein the respective centres of pressure shift with respect to said airfoils 1, 2 in opposite directions from the centre of gravity (which may be at the point 20), to thereby maintain longitudinal stability of the airplane in its varying lengthwise attitudes.

Also in view of the more extended chord of airfoil 1, and its relatively small extent of span, the total surface area of said airfoil 1 being considerably less than that of airfoils 2, the centre of pressure with respect to said airfoil 1 must shift faster than the oppositely shifting centre of pressure for airfoils 2 in order to preserve the equilibrium. For example, in the high speed attitude of Figure 2 the centre of pressure for airfoil 1 will have shifted to about the point 21 with respect thereto, and the centre of pressure for airfoils 2 will have shifted to about the point 22 therefor.

In the further example of Fig. 3, wherein the airplane is shown in a climbing attitude the centre of pressure for airfoil 1 will have shifted to about the point 23, and the centre of pressure for airfoils 2 will have shifted to about the point 4.

It will be appreciated that a stabilizing effect is achieved for the airplane by reason of the upward curvature $6^a$ at the rear under surface of airfoil 1, providing a suction pull that corrects a tendency to nose dive in descending attitudes, and by the break in the suction lift effect at the upper surface of airfoil 1 provided by the up slope, toward the trailing edge, of the concaved portion 10.

A decalage is provided by giving the airfoils 2 a positive incidence, which may for example be 2°, while leaving the airfoil 1 at zero. Obviously this relation may be varied, but my calculations show efficient results with this decalage in an airplane whose airfoils 1 and 2 have the herein designated relative proportions and contours.

In the plan view of Fig. 4 it will be seen that the rear portion 25 of airfoil 1 is of diminished width, to in this manner vary the extent of the lift surfaces.

This application is a continuation in part of my application Serial No. 435,481 filed January 6, 1921.

Variations within the spirit and scope of my invention are equally comprehended by the foregoing disclosure.

I claim:—

1. The combination in an airplane of a central airfoil of relatively short span and considerable extent of chord, and a main supporting airfoil, of moderate chord, extended from opposite sides of said central airfoil, said airfoils being contoured and arranged to have their respective centres of pressure coincide in the centre of gravity of the airplane when in the attitude of cruising speed, and said contours and arrangement causing the respective centres of pressure to shift in opposite directions, at varying speeds, in changes of longitudinal attitude.

2. The combination in an airplane of a central airfoil of relatively short span and considerable extent of chord, and a main supporting airfoil, of moderate chord, extended from opposite sides of said central airfoil, the rearward portion of said central airfoil having its upper and lower surfaces asymmetrically curved upwardly in tapering relation.

3. The combination in an airplane of a central airfoil of relatively short span and considerable extent of chord, and a main supporting airfoil, of moderate chord, extended from opposite sides of said central airfoil, the rearward portion of said central airfoil having its upper and lower surfaces asymmetrically curved upwardly in tapering relation, the rearward portion of said central airfoil being of reduced width.

Executed this 27th day of February, 1929.
VINCENT J. BURNELLI.